US011487862B2

(12) United States Patent
Shachar et al.

(10) Patent No.: US 11,487,862 B2
(45) Date of Patent: Nov. 1, 2022

(54) BASIC INPUT/OUTPUT SYSTEM PROTECTION USING MULTI-FACTOR AUTHENTICATION BASED ON DIGITAL IDENTITY VALUES

(71) Applicant: EMC IP Holding Company LLC, Hopkinton, MA (US)

(72) Inventors: Tomer Shachar, Omer (IL); Yevgeni Gehtman, Modi'in (IL); Maxim Balin, Gan Yavne (IL); Or Herman Saffar, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/151,420

(22) Filed: Jan. 18, 2021

(65) Prior Publication Data

US 2022/0229896 A1 Jul. 21, 2022

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)
*G06F 21/40* (2013.01)
*G06F 21/57* (2013.01)
*G06F 9/4401* (2018.01)
(Continued)

(52) U.S. Cl.
CPC .......... *G06F 21/40* (2013.01); *G06F 9/4403* (2013.01); *G06F 21/33* (2013.01); *G06F 21/34* (2013.01); *G06F 21/57* (2013.01); *G06F 21/72* (2013.01)

(58) Field of Classification Search
CPC ........ G06F 21/40; G06F 9/4403; G06F 21/33; G06F 21/34; G06F 21/57; G06F 21/72
See application file for complete search history.

(56) References Cited

U.S. PATENT DOCUMENTS

| 6,633,981 B1 * | 10/2003 | Davis ...................... G06F 21/57 713/185 |
| 2011/0126023 A1 * | 5/2011 | Wang ...................... G06F 21/78 726/19 |
| 2021/0234700 A1 * | 7/2021 | Ali ........................ H04L 9/3226 |

OTHER PUBLICATIONS https://nvlpubs.nist.gov/nistpubs/Legacy/SP/nistspecialpublication800-147.pdf, downloaded Jan. 13, 2021.
(Continued)

*Primary Examiner* — Amie C. Lin
(74) *Attorney, Agent, or Firm* — Ryan, Mason & Lewis, LLP

(57) ABSTRACT

Techniques are provided for basic input/output system (BIOS) protection using multi-factor authentication (MFA) based on digital identity values. One method comprises obtaining, by a BIOS of a hardware device, from a user device, (i) a request to access the BIOS, and (ii) a token based on a digital identity value for the user device; providing the token to an MFA chip on the hardware device, wherein the MFA chip evaluates the token and provides a verification result to the BIOS; and allowing the user device to access the BIOS based on the verification result. The digital identity value for the user device may be stored by the MFA chip during a fabrication of the MFA chip and/or a registration of the user device. The MFA chip may compare the digital identity value from the token received from the BIOS with the digital identity value for the user device stored by the MFA chip.

20 Claims, 7 Drawing Sheets

(51) Int. Cl.
  *G06F 21/34* (2013.01)
  *G06F 21/33* (2013.01)
  *G06F 21/72* (2013.01)

(56) References Cited

OTHER PUBLICATIONS https://www.howtogeek.com/186235/how-to-secure-your-computer-with-a-bios-or-uefi-password/, downloaded Jan. 13, 2021.
https://searchsecurity.techtarget.com/answer/How-to-bolster-BIOS-security-to-prevent-BIOS-attacks, downloaded Jan. 13, 2021.
https://www.infoworld.com/article/3029728/dell-bios-verification-extends-security-focus.html, downloaded Jan. 13, 2021.

* cited by examiner

BASIC INPUT/OUTPUT SYSTEM PROTECTION USING MULTI-FACTOR AUTHENTICATION BASED ON DIGITAL IDENTITY VALUES

FIELD

The field relates generally to information processing systems, and more particularly to the protection of such information processing systems.

BACKGROUND

Unauthorized modifications of a Basic Input/Output System (BIOS) can present a significant threat due to the unique and privileged position of the BIOS in the architecture of many devices. The BIOS typically initializes hardware during a boot process for a given device, and provides runtime services for the operating system and programs of the given device. A malicious modification of the BIOS can cause a denial of service (e.g., if the BIOS is corrupted) and/or a persistent malware presence (e.g., if malicious program is installed on the BIOS).

SUMMARY

In one embodiment, a method comprises obtaining, by a BIOS of a hardware device, from a user device, (i) a request to access the BIOS, and (ii) a token based at least in part on a digital identity value for the user device; providing the token to a multi-factor authentication chip on the hardware device, wherein the multi-factor authentication chip evaluates the token and provides a verification result to the BIOS; and allowing the user device to access the BIOS based at least in part on the verification result.

In some embodiments, the digital identity value for the user device is stored by the multi-factor authentication chip in conjunction with one or more of a fabrication of the multi-factor authentication chip and a registration of the user device to access the BIOS. The multi-factor authentication chip may compare the digital identity value from the token received from the BIOS with the digital identity value for the user device stored by the multi-factor authentication chip.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for BIOS protection using multi-factor authentication based on digital identity values.

In one or more embodiments, the disclosed BIOS protection techniques provide an access control mechanism using a token that comprises a digital identity value of the user device attempting to access a particular protected BIOS. The digital identity value of a given user device can be validated as part of a multi-factor authentication of the user device. In some embodiments, the token may be further based on a dynamic value obtained, for example, in conjunction with an out-of-band second factor authentication of the user device (e.g., a short message service (SMS) authentication that provides a dynamic code to the user device).

In at least some embodiments, the use of a digital identity value, discussed further below, for each registered hardware device, allows any unauthorized, rouge and/or malicious actors to be detected and denied access to the protected BIOS. In this manner, the digital identity value can be used to verify and authenticate a given user device that is authorized to access the protected BIOS, and to prevent malicious or hostile changes from being made to the protected BIOS, such as the BIOS of a storage system.

Figure 1:
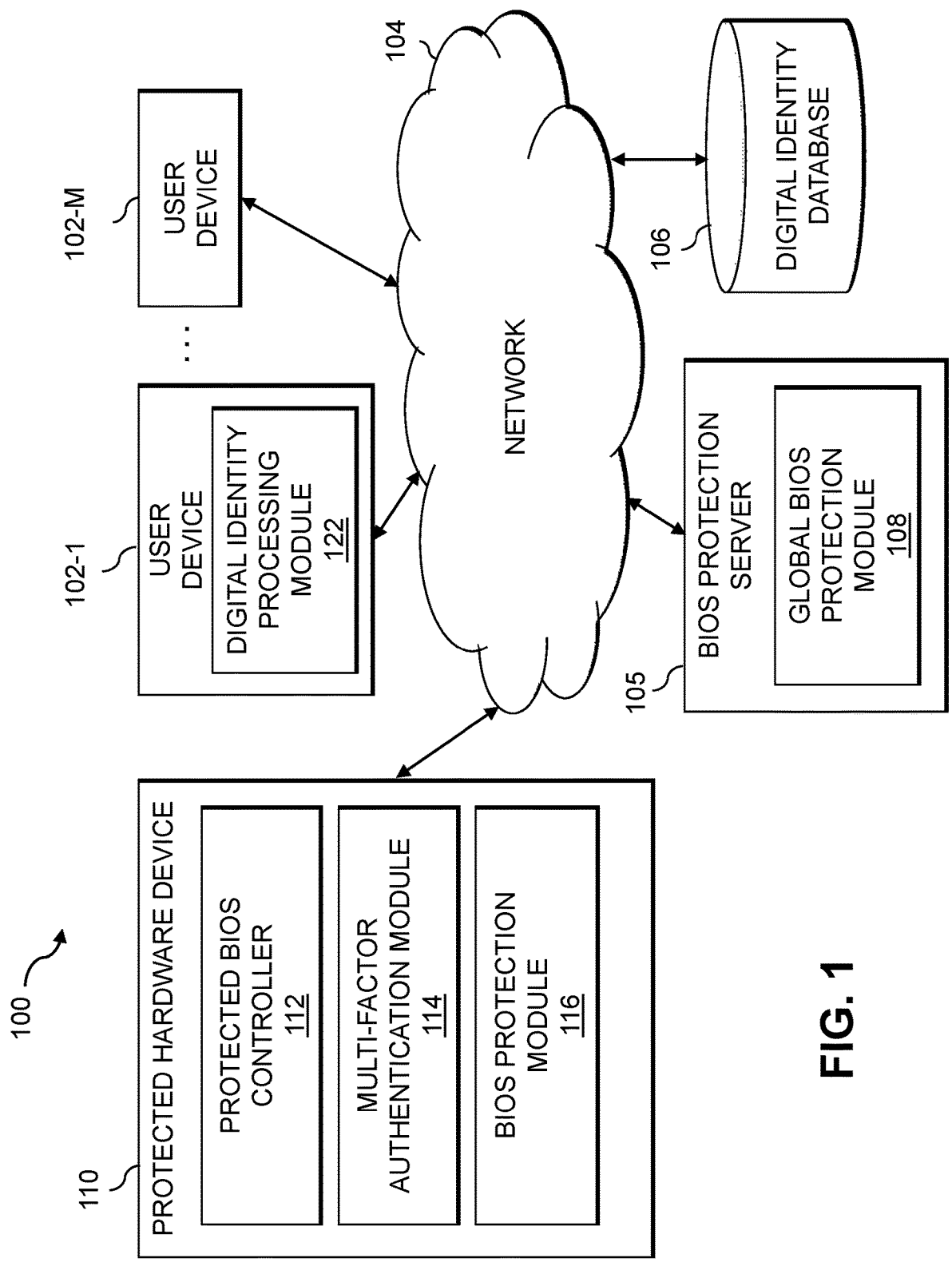
FIG. 1 illustrates an information processing system configured for BIOS protection using multi-factor authentication based on digital identity values in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is BIOS protection server 105, digital identity database 106 and a protected hardware device 110, discussed below.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

In the example of FIG. 1, one or more user devices 102, such as user device 102-1, comprises a digital identity processing module 122 that, in some embodiments, registers a digital identity value of the respective user device 102-1 with the BIOS protection server 105, as discussed further below, and provides the digital identity value to the protected BIOS as part of an attempt to access the protected BIOS.

It is to be appreciated that this particular arrangement of module 122 illustrated in the user device 102-1 of the FIG. 1 embodiment is presented by way of example only, and alternative arrangements can be used in other embodiments. For example, the functionality associated with module 122 in other embodiments can be separated across a larger number of modules. As another example, multiple distinct processors can be used to implement different ones of module 122 or portions thereof.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The BIOS protection server 105 may be implemented, for example, on the cloud or on the premises of an enterprise or another entity. In some embodiments, the BIOS protection server 105, or portions thereof, may be implemented as part of a storage system or on a host device. As also depicted in FIG. 1, the BIOS protection server 105 further comprises a global BIOS protection module 108.

It is to be appreciated that this particular arrangement of module 108 illustrated in the BIOS protection server 105 of the FIG. 1 embodiment is presented by way of example only, and alternative arrangements can be used in other embodiments. For example, the functionality associated with module 108 in other embodiments can be separated across a larger number of modules. As another example, multiple distinct processors can be used to implement different ones of module 108 or portions thereof.

At least portions of module 108 may be implemented at least in part in the form of software that is stored in memory and executed by a processor. An exemplary process utilizing module 108 of an example BIOS protection server 105 in computer network 100 will be described in more detail with reference to, for example, FIG. 2.

Additionally, the BIOS protection server 105 can have an associated digital identity database 106 configured to store, for example, digital identity values pertaining to one or more exemplary protected hardware devices 110 that may be protected using the disclosed techniques for BIOS protection. The protected hardware devices 110 may comprise, for example, storage devices, appliances, host devices and/or other devices such as mobile telephones, laptop computers, tablet computers, desktop computers or other types of computing devices.

The digital identity database 106 in the present embodiment is implemented using one or more storage systems associated with the BIOS protection server 105. Such storage systems can comprise any of a variety of different types of storage including such as network-attached storage (NAS), storage area networks (SANs), direct-attached storage (DAS) and distributed DAS, as well as combinations of these and other storage types, including software-defined storage.

The user devices 102 and the BIOS protection server 105 may be implemented on a common processing platform, or on separate processing platforms. The user devices 102 (for example, when implemented as host devices) are illustratively configured to write data to and read data to/from the storage system in accordance with applications executing on those host devices for system users.

One or more of the protected hardware devices 110 may comprise storage devices of a storage system. The storage devices illustratively comprise solid state drives (SSDs). Such SSDs are implemented using non-volatile memory (NVM) devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

It is therefore to be appreciated that numerous different types of storage devices can be protected in other embodiments. For example, a given storage system can include a combination of different types of protected storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

In some embodiments, communications between the user devices 102 over the network 104 with the BIOS protection server 105 may comprise IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with the BIOS protection server 105, protected hardware device 110 and/or storage devices.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the BIOS protection server 105 can be one or more input-output devices (not shown), which illustratively comprise keyboards, displays or other types of input-output devices in any combination. Such input-output devices can be used, for example, to support one or more user interfaces to the BIOS protection server 105, as well as to support communication between the BIOS protection server 105 and other related systems and devices not explicitly shown.

The user devices 102 and the BIOS protection server 105 in the FIG. 1 embodiment are assumed to be implemented using at least one processing device. Each such processing device generally comprises at least one processor and an associated memory, and implements one or more functional modules for controlling certain features of the BIOS protection server 105.

More particularly, user devices 102 and BIOS protection server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

A network interface allows the user devices 102 and/or the BIOS protection server 105 to communicate over the network 104 with each other (as well as one or more other networked devices), and illustratively comprises one or more conventional transceivers.

In the example of FIG. 1, the protected hardware device 110 comprises a protected BIOS controller 112, a multi-factor authentication module 114 and a BIOS protection module 116. As discussed further below, the protected BIOS controller 112 may be implemented, for example, as a BIOS (Basic Input Output System) chip, an Extensible Firmware Interface (EFI) BIOS chip, and/or a Unified Extensible Firmware Interface (UEFI) BIOS chip. It is noted that multiple protected BIOS controller 112 can be protected on a given protected hardware device 110.

It is to be appreciated that this particular arrangement of modules 114 and 116 illustrated in the protected hardware device 110 of the FIG. 1 embodiment is presented by way of example only, and alternative arrangements can be used in other embodiments. For example, the functionality associated with modules 114 and 116 in other embodiments can be implemented as a single module or device, or separated across a larger number of modules. As another example, multiple distinct processors can be used to implement different ones of modules 114 and 116, or portions thereof.

At least portions of modules 114 and 116 may be implemented at least in part in the form of software that is stored in memory and executed by a processor. An exemplary process utilizing modules 114 and 116 of an example protected hardware device 110 in computer network 100 will be described in more detail with reference to, for example, FIGS. 3 through 5.

In the example of FIG. 1, exemplary user device 102-1 attempts to access the protected BIOS controller 112 of the protected hardware device 110. In at least some embodiments discussed herein, the exemplary user device 102-1 registers with the BIOS protection server 105 with a digital identity value. The global BIOS protection module 108 of the BIOS protection server 105 manages the storage of the digital identity value of the registered user devices 102 in the multi-factor authentication module 114.

It is to be understood that the particular set of elements shown in FIG. 1 for BIOS protection using multi-factor authentication based on digital identity values is presented by way of illustrative example only, and in other embodiments additional or alternative elements may be used. Thus, another embodiment includes additional or alternative systems, devices and other network entities, as well as different arrangements of modules and other components.

Figure 2:
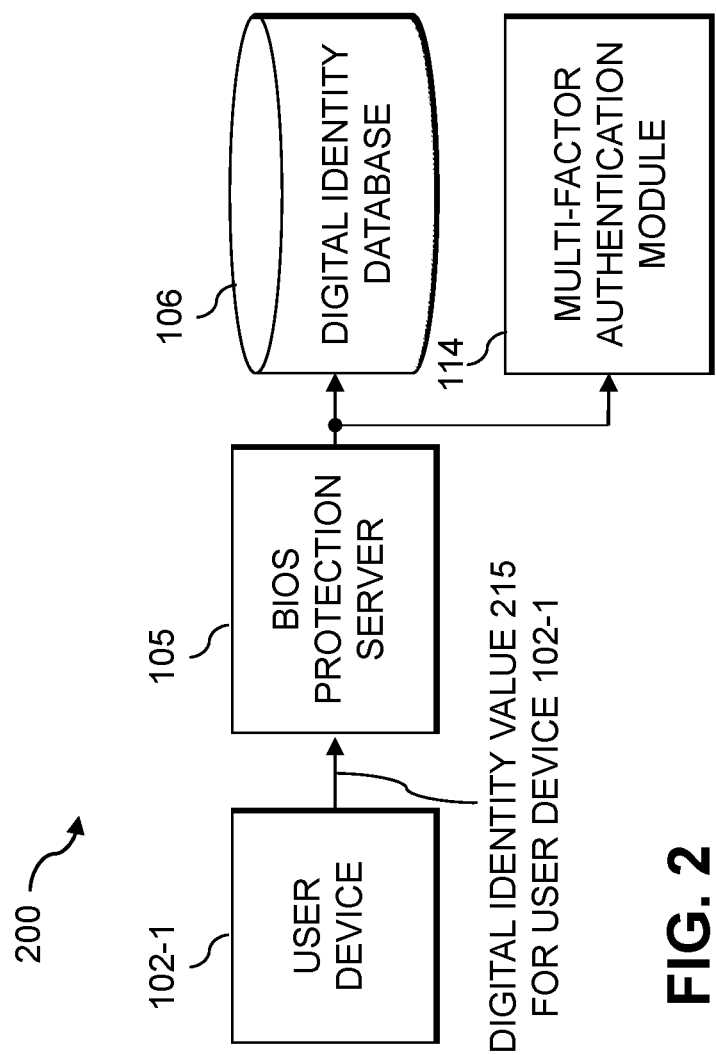
FIG. 2 illustrates a registration of a user device of FIG. 1 to access the protected BIOS of FIG. 1, according to an embodiment of the disclosure.

FIG. 2 illustrates a registration 200 of a user device 102-1 with the multi-factor authentication module 114 to access the protected BIOS of FIG. 1 using the BIOS protection server 105, according to an embodiment of the disclosure. In various embodiments, a particular user can be authorized to access the protected BIOS during fabrication of the protected hardware device 110 and/or as part of a subsequent registration of the user device 102-1 to access the protected BIOS, by flashing the digital identity value of the user device 102-1 to the multi-factor authentication module 114.

As shown in FIG. 2, in conjunction with the exemplary registration 200, a digital identity value 215 is generated for the user device 102-1, in accordance with the disclosed BIOS protection techniques. Generally, the BIOS protection server 105 can protect the protected hardware device 110 from unauthorized modifications to the BIOS by generating a digital identity value 215. In at least some embodiments, the digital identity value 215 is calculated for an inactive state of the user device 102-1.

The generated digital identity value 215 is stored in the digital identity database 106 and/or flashed to the multi-factor authentication module 114 of FIG. 1. The digital identity value 215 may be computed, for example, by applying a hash value to (a) at least one hardware identifier of one or more hardware components in the user device 102-1, such as a BIOS serial number, central processing unit (CPU) serial number, graphics processing unit (GPU) serial number, RAM part number, monitor serial number; (b) at least one software identifier of one or more software components in the user device 102-1; and/or (c) at least one network address identifier of one or more network connections of the user device 102-1, such as a virtual private network (VPN) identifier (or an RSA identifier), media access control address (MAC address) of one or more hardware elements of the user device 102-1, domain name server (DNS) address, Dynamic Host Configuration Protocol (DHCP) address or a static IP address. For example, the hash values for each identifier value may be summed and optionally combined with one or more salt values to add complexity to the digital identity value 215.

In some embodiments, the digital identity value 215 and/or the hash values associated with elements within the user device 102-1 may be signed using a certificate by a trusted authority.

Figure 3:
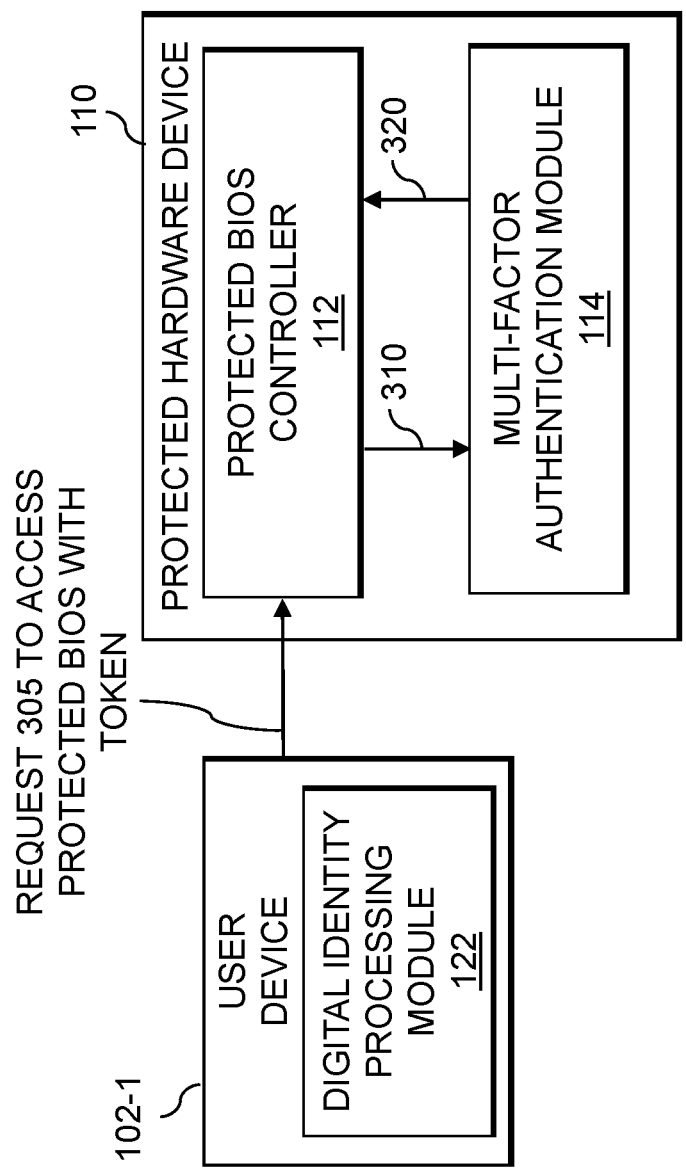
FIG. 3 illustrates the user device attempting to access a protected BIOS using a multi-factor authentication based on a digital identity value of the user device, according to some embodiments.

FIG. 3 illustrates the user device 102-1 attempting to access a protected BIOS using a multi-factor authentication based on a digital identity value of the user device 102-1, according to some embodiments. As shown in FIG. 3, the user device 102-1 sends a request 305 to the protected hardware device 110 to access the protected BIOS with a token. In at least some embodiments, the token comprises a digital identity value of the user device 102-1 and possibly a dynamic value generated in conjunction with the processing of the request 305.

In the example of FIG. 3, the protected BIOS controller 112 sends a message 310 to the multi-factor authentication module 114 comprising a request 305 for the multi-factor authentication module 114 to verify the token. The multi-factor authentication module 114 evaluates the received token and provides a response 320 with a multi-factor authentication result to the protected BIOS controller 112. For example, the multi-factor authentication module 114 may compare the digital identity value in the token received from the protected BIOS controller 112 with a token stored in the multi-factor authentication module 114. For example, the digital identity value may have been flashed to the multi-factor authentication module 114 during fabrication of the protected hardware device 110 and/or as part of a subsequent registration of the user device 102-1 to access the protected BIOS. The user device 102-1 is allowed to access the protected BIOS if the multi-factor authentication result indicates that the token has been verified or validated.

Figure 4:
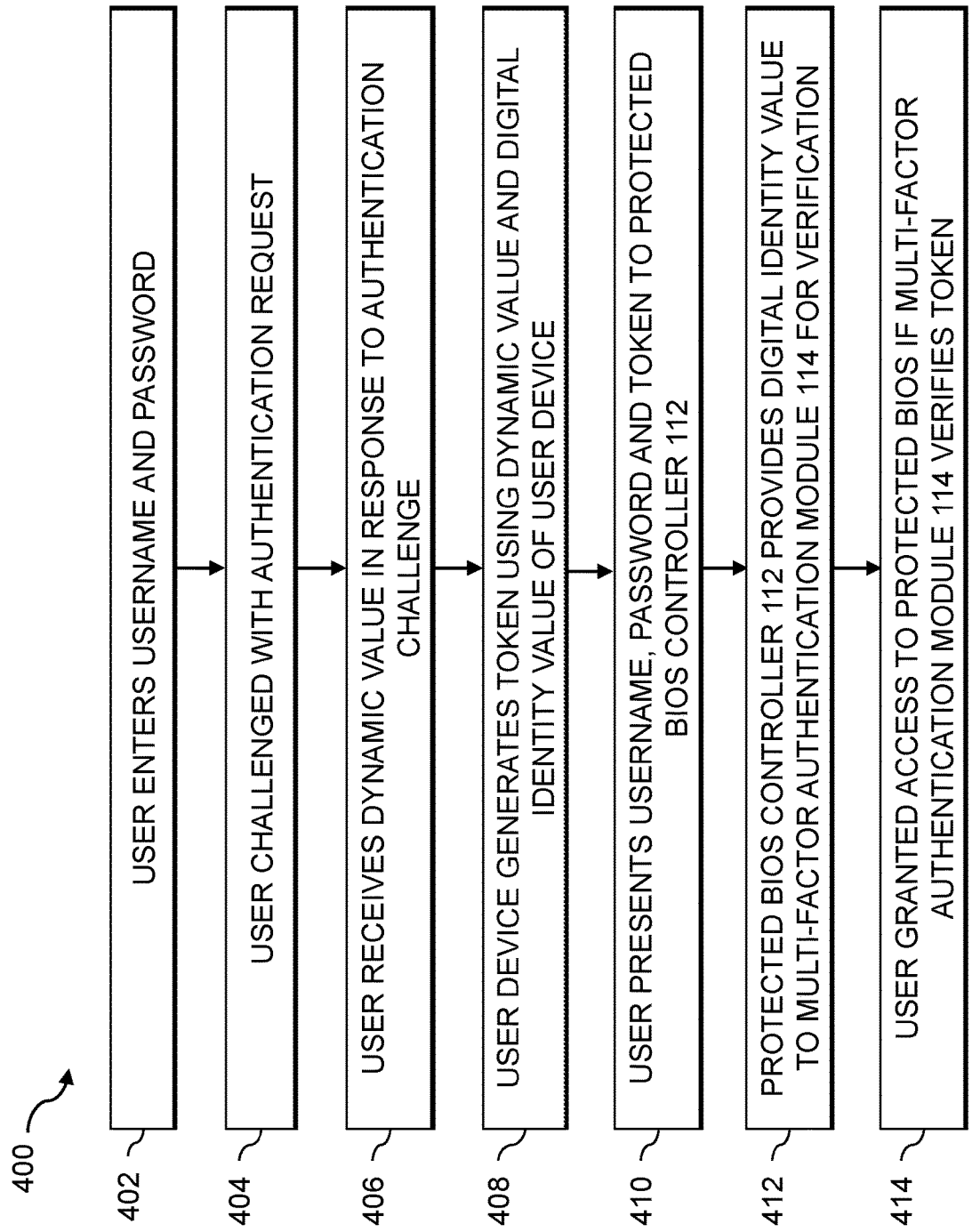
FIGS. 4 and 5 are flow diagrams illustrating exemplary implementations of BIOS protection processes using multi-factor authentication based on digital identity values, according to various embodiments of the disclosure.

FIG. 4 is a flow diagram illustrating an exemplary implementation of a BIOS protection process 400 using multi-factor authentication based on a digital identity value, according to one embodiment of the disclosure. In the example of FIG. 4, a user, using an exemplary user device 102-1, enters his or her username and password in step 402, in conjunction with an attempt to access the protected BIOS. The user is then challenged in step 404 in at least some embodiments with an authentication request (e.g., an SMS challenge).

In at least some embodiments, the user receives a dynamic value in step 406, for example, in response to an out-of-band authentication challenge, and the user device 102-1 generates a token in step 408, using the dynamic value and the digital identity value for the user device 102-1. In step 410, the user presents his or her username, password and token to the protected BIOS. The protected BIOS then provides at least the digital identity value portion of the token to the multi-factor authentication module 114 in step 412 for verification. The user is granted access to the protected BIOS in step 414 if the multi-factor authentication module 114 verifies the token.

One or more automated remedial actions can be performed based on a result of the verification in steps 412 and 414. For example, if the digital identity value 215 is not verified, the BIOS protection process 400 may detect that the user device 102 attempting to access the protected BIOS controller 112 is not authorized, and may generate an alert notification. In this manner, unauthorized modifications to the protected BIOS controller 112 are prevented.

Upon detection of an anomaly with respect to the token, the BIOS protection server 105 can optionally initiate or execute one or more predefined remedial steps and/or mitigation steps to address the detected anomaly. For example, the predefined remedial steps and/or mitigation steps to address the detected anomalies may comprise the transmission of an alert or alarm to the user device 102 and/or user for important or suspicious events; isolating, removing, quarantining, limiting permissions, analyzing, and deactivating the protected hardware device 110, one or more of the user devices 102 and/or one or more files, accounts or aspects of the protected hardware device 110, user devices 102 or the user; notifying one or more third party systems (such as sending an email, or generating an alert in another system); restricting access of one or more accounts and one or more machines or services from accessing a network, files or folders; initiating a step-up authentication with one or more additional authentication factors; resetting or limiting permissions associated with a file or folder; quarantining one or more files or folders, and preventing one or more further actions from being executed associated with the protected hardware device 110, user devices 102, user account, service or machine associated with the detected anomalous activity.

In this manner, when an unauthorized and/or malicious attempt to access the protected BIOS is detected for a given protected hardware device 110, the appropriate entity can be notified to immediately respond to the attack and further security breaches with the protected hardware device 110 can be mitigated. The impacted protected hardware device 110 can optionally be disabled from further operation or otherwise shutdown to prevent the modified protected hardware device 110 from harming the data and/or network environment of the customer.

Figure 5:
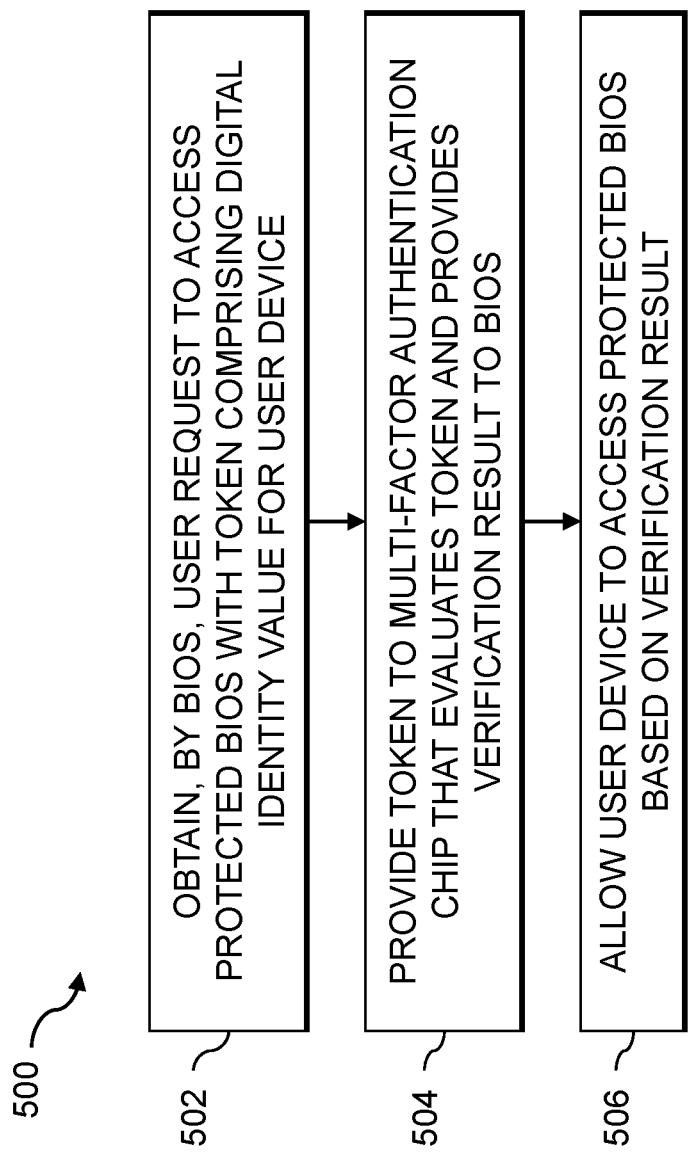

FIG. 5 is a flow diagram illustrating an exemplary implementation of a BIOS protection process 500 that uses multi-factor authentication based on a digital identity value, according to some embodiments of the disclosure. As shown in FIG. 5, the exemplary BIOS protection process 500 initially obtains, by the BIOS in step 502, a request from a user device 102-1 to access the protected BIOS. The request is received with a token comprising a digital identity value for the user device 102-1. In some embodiments, the token may further comprise a dynamic value obtained, for example, in response to an authentication, such as an out-of-band authentication, of the request that sends the dynamic value to a different device of a user of the user device 102-1.

The protected BIOS provides the token in step 504 to a multi-factor authentication module 114 on the user device 102-1 that evaluates the token and provides a verification result to the protected BIOS. In some embodiments, the token may be equivalent to the digital identity value. Finally, the BIOS protection process 500 allows the user device 102-1 to access the protected BIOS in step 506 based on the verification result.

In at least some embodiments, the digital identity value for the user device 102-1 is based at least in part on (a) at least one hardware identifier of one or more hardware components in the user device, (b) at least one software identifier of one or more software components in the user device, and/or (c) at least one network address identifier of one or more network connections of the user device. The digital identity value for the user device 102-1 can be stored by the multi-factor authentication module 114 in conjunction with a fabrication of the multi-factor authentication module 114 and/or a registration of the user device 102-1 to access the protected BIOS controller 112.

The particular processing operations and other network functionality described in conjunction with the flow diagrams of FIGS. 4 and 5, for example, are presented by way of illustrative example only, and should not be construed as limiting the scope of the disclosure in any way. Alternative embodiments can use other types of processing operations to protect BIOS using multi-factor authentication based on a digital identity value of the accessing device. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for BIOS protection using multi-factor authentication based on a digital identity value of the accessing device can be employed to verify and authenticate that unauthorized and/or malicious accesses were not made to a protected hardware device 110, for example. In this manner, the disclosed techniques for BIOS protection using multi-factor authentication based on digital identity values disable the ability of a malicious actor to improperly access and/or tamper with a protected BIOS controller 112.

Among other benefits, the disclosed BIOS protection techniques employ an asynchronous authentication that prevents attackers from intervening with protected BIOS controller 112.

One or more embodiments of the disclosure provide improved methods, apparatus and computer program products for BIOS protection using multi-factor authentication based on digital identity values. The foregoing applications and associated embodiments should be considered as illustrative only, and numerous other embodiments can be configured using the techniques disclosed herein, in a wide variety of different applications.

It should also be understood that the disclosed BIOS protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for BIOS protection using multi-factor authentication based on digital identity values may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based BIOS protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based BIOS protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
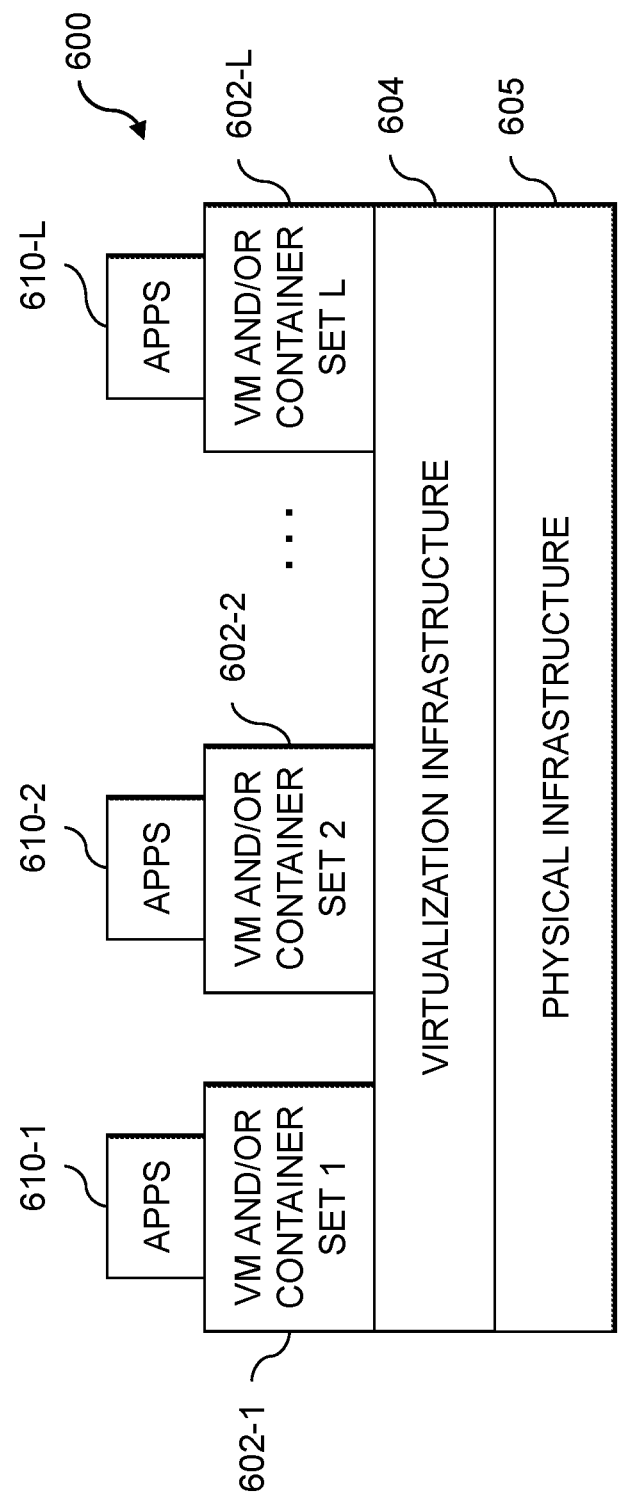
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide BIOS protection functionality of the type described above for one or more processes running on a given one of the VMs. For example, each of the VMs can implement BIOS protection control logic and associated digital identity-based token verification functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide BIOS protection functionality of the type described above for one or more processes running on different ones of the containers. For example, a container host device supporting multiple containers of one or more container sets can implement one or more instances of BIOS protection control logic and associated digital identity-based token verification functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
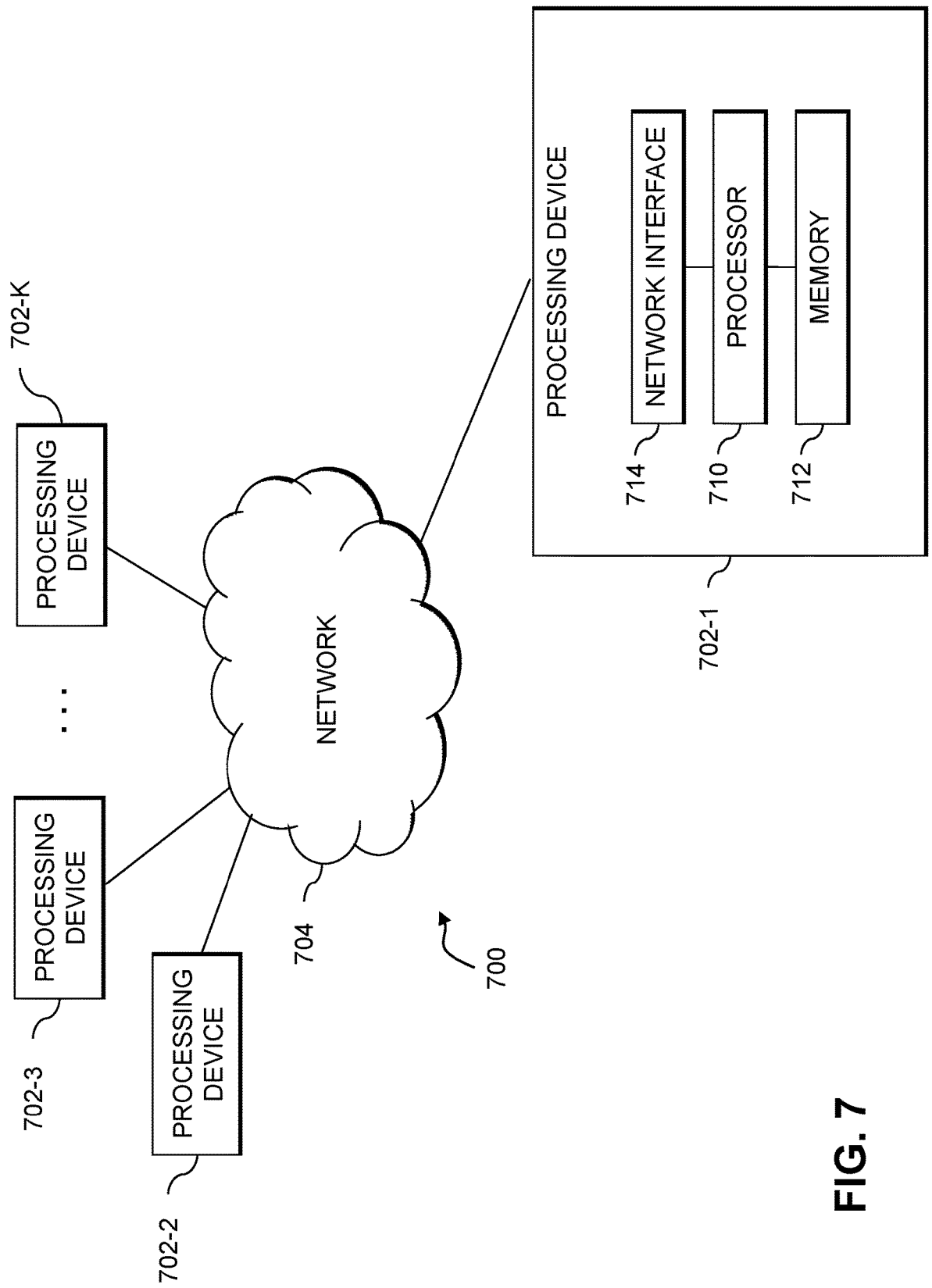
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by a basic input/output system of a hardware device, from a user device, (i) a request to access the basic input/output system, and (ii) a token based at least in part on a digital identity value for the user device, wherein the digital identity value for the user device is obtained by applying at least one function to at least one identifier of one or more of: (i) at least one component associated with the user device and (ii) at least one network connection associated with the user device;
providing the token to a multi-factor authentication chip on the hardware device, wherein the multi-factor authentication chip evaluates the token and provides a verification result to the basic input/output system; and
allowing the user device to access the basic input/output system based at least in part on the verification result;
wherein the method is performed by at least one processing device comprising a processor coupled to a memory.

2. The method of claim 1, wherein the at least one identifier comprises one or more of: (a) at least one hardware identifier of one or more hardware components associated with the user device, (b) at least one software identifier of one or more software components associated with the user device, and (c) at least one network address identifier of one or more network connections associated with the user device.

3. The method of claim 1, wherein the digital identity value for the user device is stored by the multi-factor authentication chip in conjunction with one or more of a fabrication of the multi-factor authentication chip and a registration of the user device to access the basic input/output system.

4. The method of claim 3, wherein the multi-factor authentication chip compares the digital identity value from the token received from the basic input/output system with the digital identity value for the user device stored by the multi-factor authentication chip.

5. The method of claim 1, further comprising performing one or more remedial actions in response to the token failing the verification.

6. The method of claim 1, wherein the request to access the basic input/output system further comprises one or more of a username of a user of the user device and a password of the user.

7. The method of claim 1, wherein the request to access the basic input/output system further comprises a dynamic value provided in conjunction with an evaluation of the request.

8. An apparatus comprising:
at least one processing device comprising a processor coupled to a memory;
the at least one processing device being configured to implement steps of:
obtaining, by a basic input/output system of a hardware device, from a user device, (i) a request to access the basic input/output system, and (ii) a token based at least in part on a digital identity value for the user device, wherein the digital identity value for the user device is obtained by applying at least one function to at least one identifier of one or more of: (i) at least one component and (ii) at least one network connection associated with the user device;
providing the token to a multi-factor authentication chip on the hardware device, wherein the multi-factor authentication chip evaluates the token and provides a verification result to the basic input/output system; and
allowing the user device to access the basic input/output system based at least in part on the verification result.

9. The apparatus of claim 8, wherein the at least one identifier comprises one or more of: (a) at least one hardware identifier of one or more hardware components associated with the user device, (b) at least one software identifier of one or more software components associated with the user device, and (c) at least one network address identifier of one or more network connections associated with the user device.

10. The apparatus of claim 8, wherein the digital identity value for the user device is stored by the multi-factor authentication chip in conjunction with one or more of a fabrication of the multi-factor authentication chip and a registration of the user device to access the basic input/output system.

11. The apparatus of claim 10, wherein the multi-factor authentication chip compares the digital identity value from the token received from the basic input/output system with the digital identity value for the user device stored by the multi-factor authentication chip.

12. The apparatus of claim 8, further comprising performing one or more remedial actions in response to the token failing the verification.

13. The apparatus of claim 8, wherein the request to access the basic input/output system further comprises one or more of a username of a user of the user device and a password of the user.

14. The apparatus of claim 8, wherein the request to access the basic input/output system further comprises a dynamic value provided in conjunction with an evaluation of the request.

15. A non-transitory processor-readable storage medium having stored therein program code of one or more software programs, wherein the program code when executed by at least one processing device causes the at least one processing device to perform steps of:
  obtaining, by a basic input/output system of a hardware device, from a user device, (i) a request to access the basic input/output system, and (ii) a token based at least in part on a digital identity value for the user device, wherein the digital identity value for the user device is obtained by applying at least one function to at least one identifier of one or more of: (i) at least one component and (ii) at least one network connection associated with the user device;
  providing the token to a multi-factor authentication chip on the hardware device, wherein the multi-factor authentication chip evaluates the token and provides a verification result to the basic input/output system; and
  allowing the user device to access the basic input/output system based at least in part on the verification result.

16. The non-transitory processor-readable storage medium of claim 15, wherein the at least one identifier comprises one or more of: (a) at least one hardware identifier of one or more hardware components associated with the user device, (b) at least one software identifier of one or more software components associated with the user device, and (c) at least one network address identifier of one or more network connections associated with the user device.

17. The non-transitory processor-readable storage medium of claim 15, wherein the digital identity value for the user device is stored by the multi-factor authentication chip in conjunction with one or more of a fabrication of the multi-factor authentication chip and a registration of the user device to access the basic input/output system.

18. The non-transitory processor-readable storage medium of claim 17, wherein the multi-factor authentication chip compares the digital identity value from the token received from the basic input/output system with the digital identity value for the user device stored by the multi-factor authentication chip.

19. The non-transitory processor-readable storage medium of claim 15, wherein the request to access the basic input/output system further comprises one or more of a username of a user of the user device and a password of the user.

20. The non-transitory processor-readable storage medium of claim 15, wherein the request to access the basic input/output system further comprises a dynamic value provided in conjunction with an evaluation of the request.

* * * * *